No. 873,956. PATENTED DEC. 17, 1907.
H. F. NEUMEYER.
WASTE VALVE FOR HYDRANTS.
APPLICATION FILED JULY 10, 1907.

Witnesses
Jas. F. McCathran
H. F. Riley

Horace F. Neumeyer, Inventor
By E. G. Siggers
Attorney

UNITED STATES PATENT OFFICE.

HORACE FALK NEUMEYER, OF MACUNGIE, PENNSYLVANIA.

WASTE-VALVE FOR HYDRANTS.

No. 873,956.          Specification of Letters Patent.          Patented Dec. 17, 1907.

Application filed July 10, 1907. Serial No. 383,057.

*To all whom it may concern:*

Be it known that I, HORACE FALK NEUMEYER, a citizen of the United States, residing at Macungie, in the county of Lehigh and State of Pennsylvania, have invented a new and useful Waste-Valve for Hydrants, of which the following is a specification.

The invention relates to improvements in waste valves for hydrants and analogous structures.

The object of the present invention is to improve the construction of waste valves for hydrants, more especially that shown and described in Patent No. 638,023, granted to me July 4, 1899, and to provide an exceedingly simple, inexpensive and efficient construction for permitting the water left in the discharge pipe after the flow has been cut off, to drain off and thereby prevent the hydrant from freezing in cold weather.

A further object of the invention is to provide a construction of this character, which will not be affected in its operation by sediment accumulating in the hydrant, and to cause such sediment to be carried off by the flow of water, whereby the hydrant will be self cleaning.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 2:
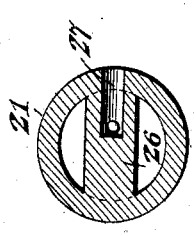
Figure 4:
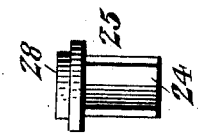
Figure 5:
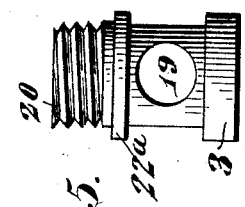
Figure 3:
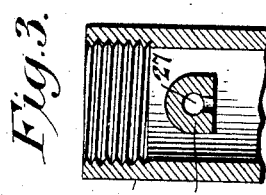
Figure 1:
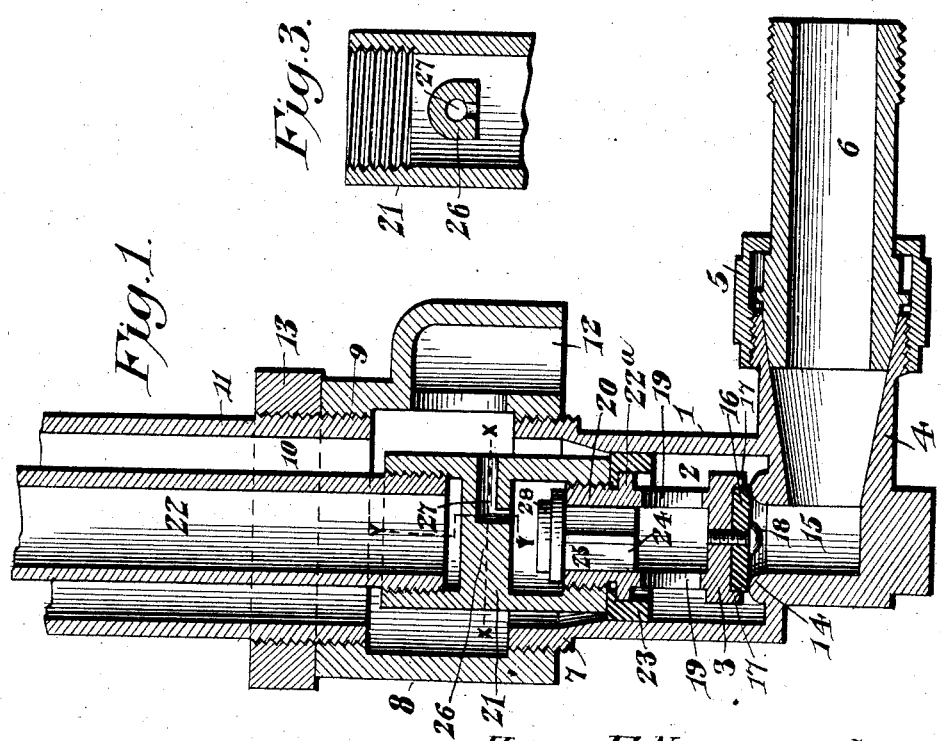

In the drawing:—Figure 1 is a vertical sectional view of a portion of a hydrant, constructed in accordance with this invention. Fig. 2 is a detail horizontal sectional view, taken substantially on the line x—x of Fig. 1. Fig. 3 is a detail vertical sectional view, taken substantially on the line y—y of Fig. 1. Fig. 4 is a detail view of the automatic lifting valve. Fig. 5 is a detail view of the plunger valve.

Like numerals of reference designate corresponding parts in all the figures of the drawing.

1 designates a vertical cylinder having a valve chamber 2 for the reception of a plunger valve 3, and provided at its lower end with an elbow 4, designed to be connected by a suitable union 5 with a water supply pipe 6.

The upper end 7 of the vertical cylinder 1 is exteriorly threaded to receive a tubular member 8, interiorly threaded at the bottom to engage the said upper end 7 of the cylinder, and provided at the top with interior screw threads 9 for engaging the lower end 10 of a pipe 11. The tubular member forms a coupling for connecting the pipe 11 with the cylinder 1, and it is provided with a drain or waste port 12. The pipe 11, which preferably in practice will be an inch and a half pipe, also receives a lock nut 13 for engaging the tubular section or member 8.

The cylinder is provided at its lower end with an interiorly arranged valve seat 14 of less diameter than the cylinder and rounded at its upper face and surrounding a reduced passage 15, communicating with the elbow 4. The valve seat consists substantially of an annular rib, which is half round in cross section to present an exterior convex face to a washer 16 of the plunger valve. The lower end of the plunger valve is provided with a depending annular flange 17, forming a seat or recess for the washer 16, which is secured to the plunger valve by a screw 18 in the ordinary manner.

The plunger valve is chambered or hollow, and is provided at opposite sides with openings 19 for the passage of water; and its upper end 20, which is exteriorly threaded, is connected by a coupling 21 with a discharge pipe 22. The ends of the coupling 21 are interiorly threaded to receive the upper end of the plunger valve, and the lower end of the discharge pipe, which is operated in the usual manner to lift the plunger valve from the seat 14 to permit water to flow through the hydrant and to lower the said plunger valve to its seat 14 to cut off the flow of water. The plunger valve is provided with an exterior annular flange 22ª, spaced from the screw threads of the upper end 20 of the plunger valve and forming a support for a cup-shaped packing 23, which is clamped between the flange and the lower end of the coupling 21.

The upper end of the plunger valve receives and forms a guide for a flanged stem 24 of an automatic lifting valve 25, which is lifted by the water flowing through the hydrant. The upward movement of the valve 25 is arrested by a cross bar 26, cast integral with the coupling 21 and located at a point intermediate of the ends thereof. The bar 26, which extends across the coupling 21, has its side edges spaced from the opposite walls thereof, and it is provided with a drain or waste passage 27, consisting of a vertical branch extending upwardly from the lower face of the cross bar at a point near the center thereof, and the horizontal branch, which extends from the vertical branch to the exterior of the coupling 21 to establish a communication between the interior of the coupling and the space surrounding the same.

The automatic lifting valve, which is of less diameter than the interior of the coupling 21, is provided at the upper end of the stem with a head, which normally rests upon the upper end of the plunger valve to exclude sediment from the interior of the chamber 1 and the valve seat 14. The head of the valve is exteriorly recessed to provide a reduced upper portion 28, which is adapted to cover and close the lower end of the vertical branch of the drain or waste passage 27, when the water is turned on, thereby preventing any leakage of water through the drain passage 27 and the drain port 12, when the hydrant is in use. When the water is turned on, the pressure below the valve 25 lifts the same, and the water flows freely around the head of the valve and upward at opposite sides of the cross bar 26. The flanged stem provides passages for the water, when the valve 25 is open, and as soon as the water is cut off the valve 25 being relieved of pressure, drops by gravity to its seat on the upper end of the plunger valve, thereby opening the drain passage and permitting the water within the discharge pipe 22 to drain from the hydrant through the passage 27 and the port 12. This will prevent any freezing of the hydrant in cold weather, and as there is ample space between the valve 25 and the sides of the coupling 21, any sediment collecting in the lower portion of the neck will not interfere with the operation of the valve, and such sediment will be carried off by the water.

Having thus fully described my invention, what I claim as new and desire to secure by Letters Patent, is:—

1. In a waste valve, the combination with a cylinder, and a discharge pipe, of a plunger valve operating in the cylinder, a coupling connecting the plunger valve with the discharge pipe and provided with a cross bar having a drain passage, and an automatic lifting valve operating within the coupling at a point below the cross bar and spaced from the walls of the said coupling, said lifting valve being normally seated on the plunger valve and arranged to close the drain passage.

2. In a waste valve, the combination with a cylinder, and a discharge pipe, of a plunger valve operating in the cylinder, a coupling connecting the plunger valve with the discharge pipe and provided with a cross bar having a drain passage extending from the lower face of the cross bar at a point intermediate of the ends thereof to the exterior of the coupling, and an automatic lifting valve provided with a flanged stem guided in the upper portion of the plunger valve, said lifting valve being normally seated on the plunger valve and spaced from the walls of the coupling and arranged to close the drain passage.

3. In a waste valve, the combination with a cylinder, and a discharge pipe, of a plunger valve operating within the cylinder, a coupling connecting the plunger valve with the discharge pipe and provided with a cross bar having a flat lower face spaced from the plunger valve, said cross bar being also provided with a drain passage consisting of a vertical branch extending upwardly from the lower face of the cross bar, and a horizontal branch extending from the vertical branch to the exterior of the coupling, and an automatic lifting valve spaced from the walls of the coupling and provided with a flanged stem guided in the upper end of the plunger valve.

In testimony, that I claim the foregoing as my own, I have hereto affixed my signature in the presence of two witnesses.

HORACE FALK NEUMEYER.

Witnesses:
DAVID J. NAGLE,
MABEL A. NONNEMACHER.